United States Patent
Conner et al.

(10) Patent No.: US 7,570,205 B2
(45) Date of Patent: Aug. 4, 2009

(54) AUTOMATIC DETECTION OF GPS SA BASE VALUE FOR HFOM

(75) Inventors: Kevin J Conner, Kent, WA (US); Steve C. Johnson, Issaquah, WA (US)

(73) Assignee: Honeywell International Inc., Morristown, NJ (US)

( * ) Notice: Subject to any disclaimer, the term of this patent is extended or adjusted under 35 U.S.C. 154(b) by 284 days.

(21) Appl. No.: 11/161,340

(22) Filed: Jul. 29, 2005

(65) Prior Publication Data

US 2007/0024495 A1 Feb. 1, 2007

(51) Int. Cl.
*G01S 1/00* (2006.01)
*G01S 5/14* (2006.01)

(52) U.S. Cl. .................... 342/357.06; 342/357.03

(58) Field of Classification Search ............ 342/357.06, 342/357, 450, 451, 457; 340/970
See application file for complete search history.

(56) References Cited

U.S. PATENT DOCUMENTS

| | | | | |
|---|---|---|---|---|
| 5,293,318 A * | 3/1994 | Fukushima | ................. | 701/216 |
| 5,347,546 A * | 9/1994 | Abadi et al. | ................. | 375/316 |
| 5,373,296 A * | 12/1994 | Ishino et al. | .................... | 342/4 |
| 5,416,712 A * | 5/1995 | Geier et al. | ................. | 701/216 |
| 5,590,043 A * | 12/1996 | McBurney | ................. | 701/207 |
| 5,731,786 A * | 3/1998 | Abraham et al. | ....... | 342/357.08 |
| 5,751,244 A * | 5/1998 | Huston et al. | .......... | 342/357.03 |
| 5,839,080 A * | 11/1998 | Muller et al. | ................... | 701/9 |
| 5,986,575 A * | 11/1999 | Jones et al. | ................. | 340/906 |
| 6,055,477 A * | 4/2000 | McBurney et al. | .......... | 701/207 |
| 6,407,701 B2 * | 6/2002 | Ito et al. | ................. | 342/357.12 |
| 6,456,938 B1 * | 9/2002 | Barnard | ....................... | 701/213 |
| 6,785,594 B1 * | 8/2004 | Bateman et al. | ................ | 701/9 |
| 6,798,377 B1 | 9/2004 | Lupash et al. | | |
| 6,847,893 B1 * | 1/2005 | Lupash | ........................ | 701/213 |
| 7,110,883 B1 * | 9/2006 | Pemble et al. | .............. | 701/214 |
| 2001/0024172 A1 * | 9/2001 | Ito et al. | ................. | 342/357.02 |
| 2002/0116098 A1 * | 8/2002 | Maynard | ...................... | 701/13 |
| 2002/0161523 A1 * | 10/2002 | Endo | ........................... | 701/213 |
| 2004/0204852 A1 * | 10/2004 | Robbins | ...................... | 701/214 |

OTHER PUBLICATIONS

Lachapelle G., Navigation accuracy for absolute positioning, Jul. 1, 1996, Agard Lecture Series, ISSN: 0549-7213.
Van Dyke K L, the world after SA: benefits to GPS integrity, Mar. 13, 2000, pp. 387-394.

* cited by examiner

*Primary Examiner*—Thomas H Tarcza
*Assistant Examiner*—Harry Liu

(57) ABSTRACT

An apparatus and method for detecting the type of Selective Availability (SA) engine in a Global Positioning System (GPS) receiver. The apparatus reverse computes a User Equivalent Range Error (UERE) value and filters it. The filtered value is run through a hysteresis to determine the GPS engine type. The engine type determination is used to adjust values used by other systems.

11 Claims, 2 Drawing Sheets

AUTOMATIC DETECTION OF GPS SA BASE VALUE FOR HFOM

BACKGROUND OF THE INVENTION

There are currently at least three types of Global Positioning System (GPS) engines used on GPS receivers for generating GPS data: Selective Availability (SA)-on, SA-on/off, and Dynamic SA-on/off. These engines attempt to compensate for the SA state of satellites and atmospheric or other satellite errors by inflating the actual Horizontal Figure of Merit (HFOM). A single aircraft may include a combination of these GPS receiver engines.

SA was turned off in May of 2000 and will continue to be off for the foreseeable future. With SA off, the GPS accuracy is possible to around 10 meters. However, the three types of GPS engines report different values for HFOM because of their differing assumptions about the satellites. The SA-on engine will report numbers with accuracy of 55 to 100 meters. The SA-on/off engine will report HFOMs of 18 to 46 meters. The Dynamic SA-on/off engine will report HFOMs of 10 to 18 meters. Although the HFOM is generally acceptable when received from the SA-on/off and Dynamic SA-on/off engines, accommodating the SA-on engine requires expanding the threshold values.

Therefore, there is a need to detect the GPS engine type of a receiver to allow receiving systems to optimally operate.

BRIEF SUMMARY OF THE INVENTION

In one embodiment, the invention determines the engine type by using Horizontal Figure of Merit (HFOM) and Horizontal Dilution of Precision (HDOP) values determined by a Global Positioning System (GPS) receiver to compute a User Equivalent Range Error (UERE) and filter it. The filtered UERE value is run through a hysteresis to determine the GPS receiver type.

BRIEF DESCRIPTION OF THE SEVERAL VIEWS OF THE DRAWING

The preferred and alternative embodiments of the present invention are described in detail below with reference to the following drawings.

DETAILED DESCRIPTION OF THE INVENTION

Figure 1:
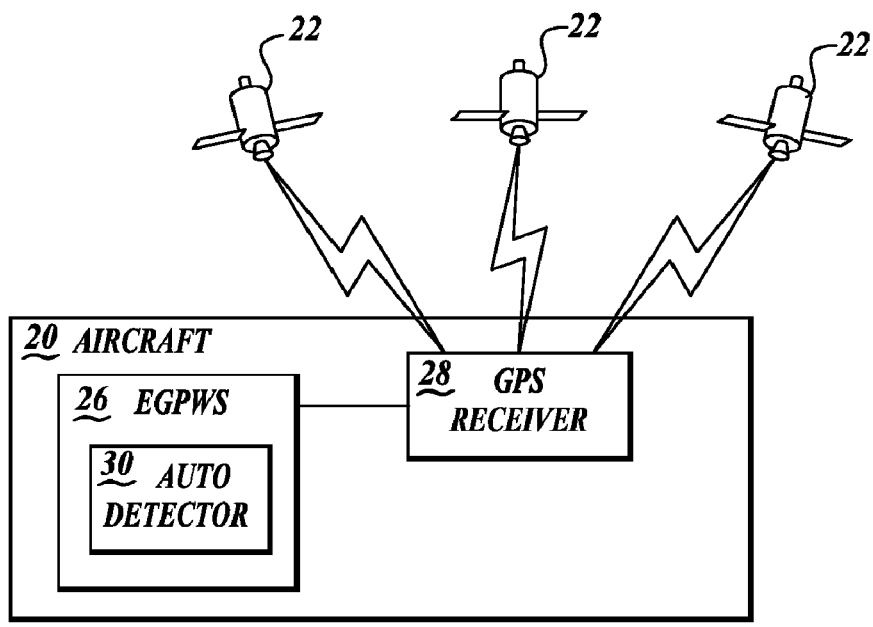
FIG. 1 illustrates a block diagram of an example environment and aircraft formed in accordance with an embodiment of the present invention.

FIG. 1 illustrates a block diagram of an example environment and aircraft 20 formed in accordance with an embodiment of the present invention. The aircraft 20 includes a Global Positioning System (GPS) receiver 28 and an Enhanced Ground Proximity Warning System (EGPWS) 26 or another system that uses GPS information that is received by the GPS receiver 28 from a plurality of satellites 22. In one embodiment, the EGPWS 26 includes an automatic GPS engine detector 30. The automatic GPS engine detector 30 analyzes data sent from each of the satellites 22 and determines the type of GPS engine included in the receiver 28. If the auto detector 30 determines that a GPS engine is of the Selective Availability (SA)-on type, limits for some of the data that is sent are reset to more applicable values.

Figure 2:
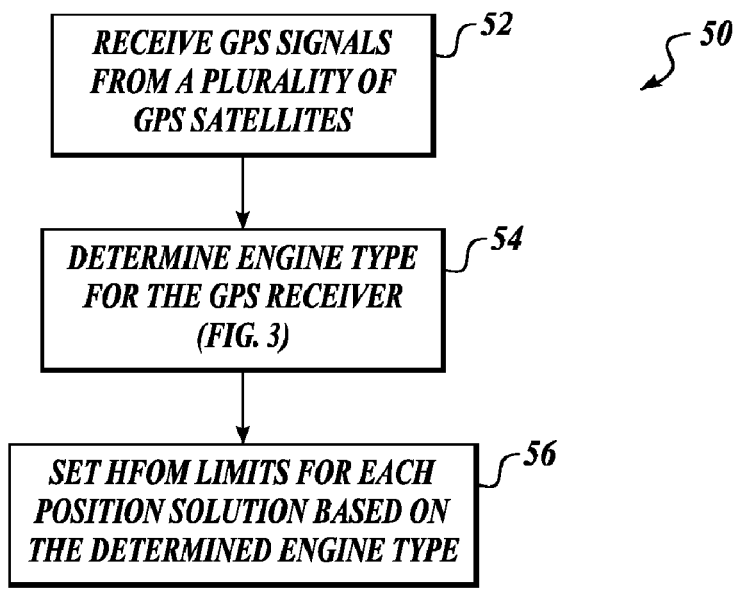
FIGS. 2 and 3 illustrate a flow diagram of an example process performed by the auto detector of FIG. 1 in accordance with an embodiment of the invention.
Figure 3:
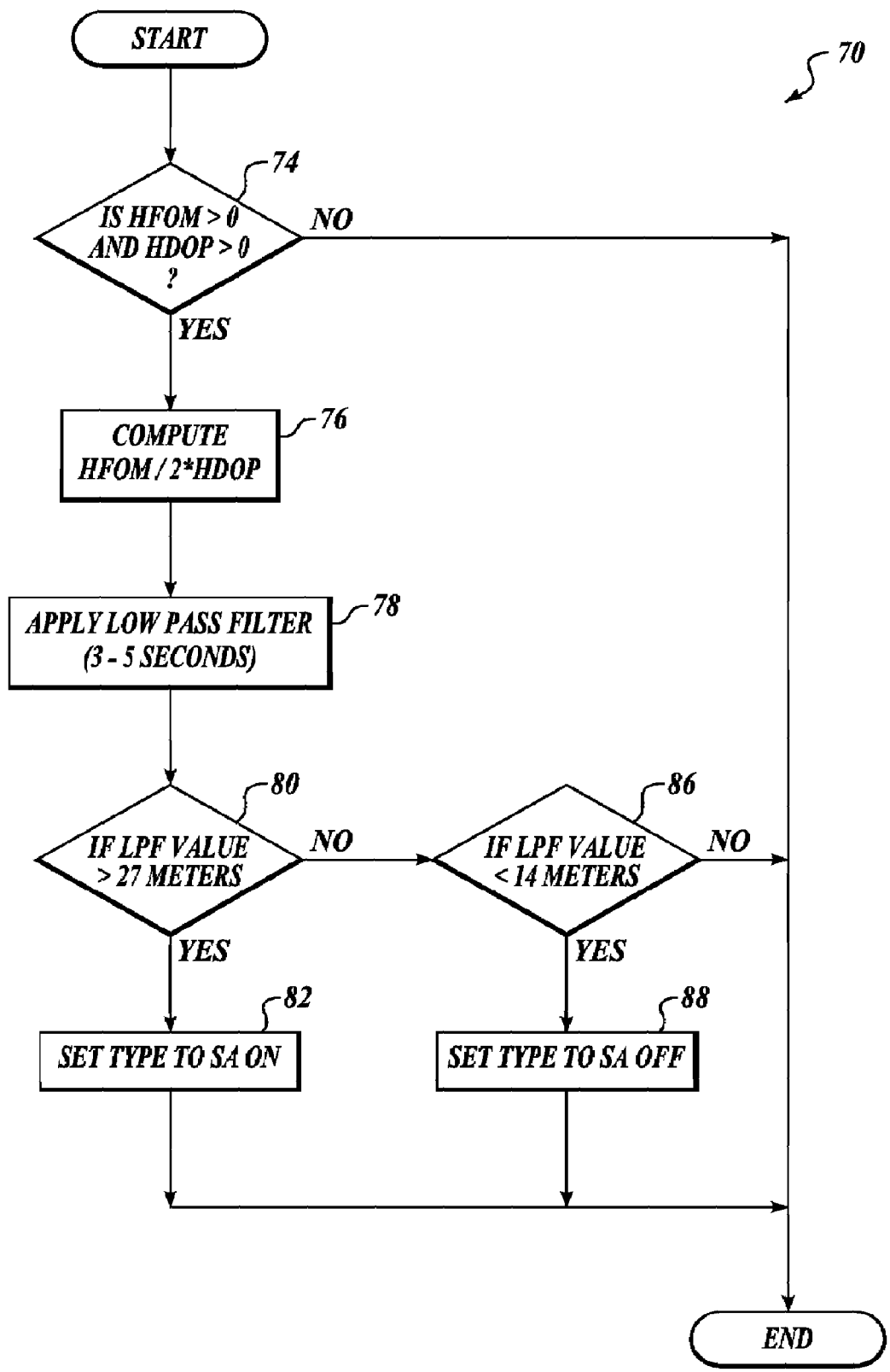

FIGS. 2 and 3 illustrate a flow diagram of an example process 50 performed by the detector 30 of FIG. 1, in accordance with an embodiment of the invention. As shown in FIG. 2, the process 50 begins at a block 52 whereby the GPS receiver 28 receives GPS signals from one or more of the plurality of GPS satellites 22. Next, at a block 54 the detector 30 receives the GPS signals from the GPS receiver 28 and determines the engine type for the GPS receiver 28. The process performed at the block 54 is described in more detail below with regard to FIG. 3.

At a block 56, Horizontal Figure of Merit (HFOM) limits for each position solution are set based on the determined engine type. In one embodiment, the HFOM limits are not changed if the engine type is determined to be an SA-on/off or Dynamic SA-on/off type. The HFOM limits are set to a predefined value if the step performed at the block 54 determines that the engine 70 type is an SA-on type. Thus, the process 50 can be performed at start-up of the receiver 28 and detector 30.

FIG. 3 shows a process at block 54 from FIG. 2 for determining the GPS receiver engine type, in accordance with an embodiment of the invention. First, at a decision block 74, the process 70 determines whether HFOM and a Horizontal Dilution of Precision (HDOP) values are greater than 0. The process 70 is complete if the results of the decision block 74 indicate that either the HFOM or HDOP values are equal to or less than 0. However, if both the HFOM and HDOP values are greater than 0, the process 70 continues to block 76 where an estimate User Equivalent Range Error (UERE) is computed. The UERE estimate is computed with the following equation:

$$\frac{HFOM}{2(HDOP)}$$

At a block 78, the result of the computation performed at block 76 is sent to a low pass filter. A first decision block 80 determines if the result of the low pass filtering performed at the block 78 is greater than 27 meters. If the output of the low pass filter is greater than 27 meters, then the GPS engine for the receiver is determined to be an SA-on type. If the output of the low pass filter is less than 27 meters, then a second decision block 86 determines whether the output of the low pass filter is less than 14 meters. If the output of the low pass filter is not less than 14 meters, then the process ends. If the output of the low pass filter is less than 14 meters, then the GPS engine for the receiver is determined to be an SA-off type. Thus, the process 70 described in the above embodiment determines whether a GPS engine is an SA-on or SA-off type. The values used at the decision blocks 80 and 86 may vary depending upon desired results. Also, the low pass filter is pre-charged to a central value of approximately 20.5 meters, but could be of other values depending upon the desired filtering results.

In one particular embodiment, a Runway Awareness and Advisory System (RAAS) uses the determination of whether the engine is an SA-on or SA-off type to set appropriate thresholds. RAAS sets the threshold for operation to 0.05 nm for an SA-on receiver engine and to 0.02 nm for an SA-off receiver engine to reduce nuisances while improving availability. In another particular embodiment, EGPWS uses the determination of whether the engine is an SA-on or SA-off type to evaluate whether to re-compute the HFOM value. The HFOM value is not re-computed when the engine type is an SA-off; however, the HFOM value is recomputed when the engine type is an SA-on (e.g. HFOM=2 ×8 meters×HDOP).

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. An apparatus for automatically determining a Selective Availability (SA) engine type of a Global Positioning System (GPS) receiver, the apparatus comprising:
    a GPS receiver configured to receive signals from at least one GPS satellite, the receiver having a SA engine configured to set at least one value based on a predefined SA engine type; and
    a detector configured to determine the SA type of the SA engine based on a Horizontal FIG. of Merit (HFOM) value and a Horizontal Dilution of Precision (HDOP) value received from the GPS receiver, wherein the detector comprises:
        a first component configured to compute an estimate of User Equivalent Range Error (UERE) based on the HFOM and the HDOP values;
        a second component configured to filter the UFRE estimate; and
        a third component configured to determine the SA engine type based on the filtered UERE,
    wherein the receiver and detector are mounted in an aircraft.

2. The apparatus of claim 1, further comprising a component configured to set at least one value based on the engine type determination, wherein the at least one value includes a Horizontal Figure of Merit (HFOM) limit.

3. The apparatus of claim 1, wherein the second component filters based on a hysteresis analysis.

4. A method for automatically determining a selective availability engine type of a Global Positioning System (GPS) receiver, the method comprising:
    a) receiving signals from a GPS receiver having a selective availability engine;
    b) determining the type of the selective availability engine based on the received signals;
    c) adjusting at least one value based on the engine type determination; and
    d) receiving at least one Horizontal Figure of Merit (HFOM) value and at least one Horizontal Dilution of Precision (HDOP) value from the GPS receiver,
    wherein determining further comprises:
        computing an estimate of User Equivalent Range Error (UERE) based on the HFOM and the HDOP values;
        filtering the UERE estimate; and
        determining the engine type based on the filtered UERE,
    wherein a)-d) performed in an aircraft.

5. The method of claim 4, wherein the at least one value includes a horizontal figure of merit (HFOM) limit.

6. The method of claim 4, wherein filtering includes a hysteresis analysis.

7. The method of claim 4, wherein filtering includes a hysteresis analysis.

8. An apparatus for automatically determining a selective availability engine type of a Global Positioning System (GPS) receiver, the apparatus comprising:
    a means for receiving signals from a GPS receiver having a selective availability engine;
    a means for determining the type of the selective availability engine based on the received signals;
    a means for adjusting at least one value based on the engine type determination; and
    a means for receiving at least one Horizontal Figure of Merit (HFOM) value and at least one Horizontal Dilution of Precision (HDOP) value from the GPS receiver,
    wherein determining further comprises:
        a means for computing an estimate of User Equivalent Range Error (UERE) based on the HFOM and the HDOP values;
        a means for filtering the UERE estimate; and
        a means for determining the selective availability engine type based on the filtered UERE,
    wherein the means for receiver and the means for determining are mounted in an aircraft.

9. The apparatus of claim 8, wherein the means for filtering includes a hysteresis analysis.

10. The apparatus of claim 8, wherein the at least one value includes a Horizontal Figure of Merit (HFOM) limit.

11. The apparatus of claim 8, wherein the means for filtering includes a hysteresis analysis.

* * * * *